United States Patent
Kim et al.

(10) Patent No.: US 8,392,597 B2
(45) Date of Patent: Mar. 5, 2013

(54) METHOD AND APPARATUS FOR PROVIDING PAIR PLAY SERVICE

(75) Inventors: Mun-jo Kim, Suwon-si (KR); Eun-hee Rhim, Yongin-si (KR); Hyung-tak Choi, Suwon-si (KR); Soon-back Cha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 547 days.

(21) Appl. No.: 12/719,474

(22) Filed: Mar. 8, 2010

(65) Prior Publication Data

US 2011/0119393 A1    May 19, 2011

(30) Foreign Application Priority Data

Nov. 16, 2009  (KR) .................. 10-2009-0110500

(51) Int. Cl.
*G06F 15/16* (2006.01)

(52) U.S. Cl. .......... 709/231; 710/110; 715/716; 725/110
(58) Field of Classification Search .......... 709/200–203, 709/217–227, 231; 710/110; 715/716; 725/110
See application file for complete search history.

(56) References Cited

U.S. PATENT DOCUMENTS

| | | | |
|---|---|---|---|
| 8,239,906 B2 * | 8/2012 | Kim et al. | 725/110 |
| 2009/0049384 A1 * | 2/2009 | Yau | 715/716 |
| 2009/0204603 A1 * | 8/2009 | Martino et al. | 707/5 |
| 2010/0175099 A1 * | 7/2010 | Kim et al. | 725/110 |

* cited by examiner

*Primary Examiner* — Moustafa M Meky
(74) *Attorney, Agent, or Firm* — Sughrue Mion, PLLC

(57) ABSTRACT

A method and apparatus for providing a pair play service, the method including: searching, by a master device, for a slave device that provides the pair play service; searching, by the master device, for the pair play service of the searched slave device; and searching, by the master device, for a pair play application constituting the searched pair play service.

36 Claims, 13 Drawing Sheets

FIG. 6

NOTIFY Method (610)

NOTIFY * HTTP/1.1
HOST: 239.255.255.250:1900
CACHE-CONTROL: max-age = 1800
LOCATION: http://myipaddress.com/device-description-rootdevice.xml
NT: urn:samsung-com:service:pairplayservice:1
NTS: ssdp:alive
SERVER: Linux/2.6 UPnP/1.1 SamTV/1.0
USN: uuid:device-UUID::urn:samsung-com:service:pairplayservice:1
BOOTID.UPNP.ORG: number increased each time device sends an initial announce or an update message
CONFIGID.UPNP.ORG: number used for caching description information
SEARCHPORT.UPNP.ORG: number identifies port on which device responds to unicast M-SEARCH
[blank line]

M-SEARCH Method (620)

HTTP/1.1 200 OK
CACHE-CONTROL: max-age = 30
DATE: Sun, 06 Nov 1994 08:49:37 GMT
EXT:
LOCATION: http://myIPAddress.com/device-desc.xml
SERVER: Linux/2.6 UPnP/1.1 SamTV/1.0
ST: urn:samsung-com:service:pairplayservice:1 (NT와 같아야 함)
USN: uuid:device-UUID::urn:samsung-com:service:pairplayservice:1
BOOTID.UPNP.ORG: 1
CONFIGID.UPNP.ORG: 1 (Optional)
SEARCHPORT.UPNP.ORG: 45123 (Optional)
[blank line]

METHOD AND APPARATUS FOR PROVIDING PAIR PLAY SERVICE

CROSS-REFERENCE TO RELATED PATENT APPLICATION

This application claims the benefit of Korean Patent Application No. 10-2009-0110500, filed on Nov. 16, 2009 in the Korean Intellectual Property Office, the disclosure of which is incorporated herein in its entirety by reference.

BACKGROUND

1. Field

Aspects of the present inventive concept relate to a convergence service, and more particularly, to a method and apparatus for providing a pair play service which provides a convergence service between a plurality of paired devices on a network.

2. Description of the Related Art

As networks have grown in size and complexity and more Internet protocol (IP) environments have been created, a user uses multimedia content in an environment where a television (TV), a personal computer (PC), and a mobile phone are converged together. The term 3Screen refers to three screens of the TV, the PC, and the mobile phone, and more broadly refers to a converged environment using multimedia content.

That is, a user who is watching multimedia content on the Internet may seamlessly view the multimedia content anytime and anywhere. For example, a user who is watching a soap opera using his/her mobile phone in a bus may get to work and view the soap opera on his/her PC in the office. Also, the user may come home from work and finish watching the remaining part of the soap opera at home. That is, in a 3Screen environment, one multimedia content (e.g., the soap opera) can be seamlessly communicated between devices.

Users can seamlessly consume multimedia content by loading applications with various functions onto devices in a 3Screen environment.

SUMMARY

The exemplary embodiments provide a method and apparatus for providing pair play service which provides a convergence service between a plurality of paired devices on a network, and a computer-readable recording medium having embodied thereon a program for executing the method.

According to an aspect of an exemplary embodiment, there is provided a method of providing pair play service which is performed by a master device, the method including: searching, by the master device, for a slave device that provides the pair play service; searching, by the master device, for the pair play service of the searched slave device; and searching, by the master device, for a pair play application constituting the searched pair play service.

The searching for the slave device may include acquiring a location of a device description which is included in a response message to an M-SEARCH message unicast by the master device or a NOTIFY message multicast by the slave device.

The searching for the pair play service may include acquiring the device description by using the acquired location of the device description, and acquiring, from the acquired device description, a location of a pair play service description which is included in the device description.

The searching for the pair play application may include acquiring the pair play service description by using the location of the pair play service description, and acquiring at least one of transactionURL information indicating a uniform resource locator (URL) for transmitting and receiving data commonly related to the pair play application, a pair play application type, a pair play application name, a pair play application ID, a pair play application version, cmdDeliverPath information indicating a URL for transmitting and receiving data related to the pair play application, capability information used to execute the pair play application, and icon information about the pair play application, by using a simple object access protocol (SOAP) action that acquires a pair play application list which is included in the pair play service description.

The pair play application type may include at least one of a widget type, a Java type, a HyperText Markup Language (HTML) type, and a native type.

The method may further include matching, with the pair play application of the slave device, a pair play application of the master device having a same pair play application ID as the acquired pair play application ID.

The method may further include determining whether the acquired capability information is satisfied, wherein the capability information includes at least one of resource information and plug-in information used to execute the pair play application.

The transactionURL information or the cmdDeliverPath information may include a uniform resource locator (URL) and/or port information used to communicate between the master device and the slave device by using the pair play application.

The method may further include: generating a session of the pair play application for communicating with the slave device by using the transactionURL information or the cmdDeliverPath information; generating a RequestMsg in order to send a request message to the slave device over the generated session; transmitting the generated RequestMsg to the slave device over the generated session; and receiving, as a response message to the transmitted RequestMsg, a ResponseMsg from the slave device over the generated session.

The RequestMsg or the ResponseMsg may include a device ID included in the device description, the pair play application ID included in the pair play service description, a session ID which identifies the generated session, and a commandID that identifies an operation of the pair play application.

The RequestMsg may perform at least one of control of the pair play application, transmission/reception of data of the pair play application, transmission/reception of a status of the pair play application, and control of the slave device by using the pair play application.

If the RequestMsg performs the control of the pair play application, the RequestMsg may include a second commandID that identifies at least one of installation of the pair play application, execution of the pair play application, suspension of the execution of the pair play application, and removal of the pair play application.

If the RequestMsg performs the transmission/reception of the status of the pair play application, the RequestMsg may include a statusCheckType that identifies a status type of the pair play application.

If the RequestMsg performs the control of the slave device by using the pair play application, the RequestMsg may include a command that controls the slave device.

The ResponseMsg may include at least one of an error code, which identifies a type of an error occurring while the slave device processes the transmitted RequestMsg, and an error description of the error.

According to an aspect of another exemplary embodiment, there is provided a computer-readable recording medium having embodied thereon a program for executing the method.

According to an aspect of another exemplary embodiment, there is provided a master device including: a device searching unit which searches for a slave device that provides a pair play service; a service searching unit which searches for the pair play service of the searched slave device; and an application searching unit which searches for a pair play application constituting the searched pair play service.

According to an aspect of yet another exemplary embodiment, there is provided a slave device providing a pair play service to a master device, the slave device including: a pair play application having an operation controlled by the master device as the pair play service; and a pair play service agent which transmits, to the master device, a location of a device description used by the master device to locate the pair play application, and which receives, from the master device, data used to perform the operation of the pair play application, the data being received over a session of the pair play application generated by the master device.

According to an aspect of still another exemplary embodiment, there is provided a system performing a pair play service, the system including: a slave device which provides the pair play service, the slave device including a pair play application constituting the pair play service; and a master device including: a device searching unit which searches for the slave device that provides a pair play service, a service searching unit which searches for the pair play service of the searched slave device, and an application searching unit which searches for the pair play application of the slave device constituting the searched pair play service.

BRIEF DESCRIPTION OF THE DRAWINGS

The above and other features and advantages of the inventive concept will become more apparent by describing in detail exemplary embodiments thereof with reference to the attached drawings in which:

FIG. 6 illustrates methods of searching for a device, according to exemplary embodiments;

DETAILED DESCRIPTION OF THE EXEMPLARY EMBODIMENTS

Figure 1:
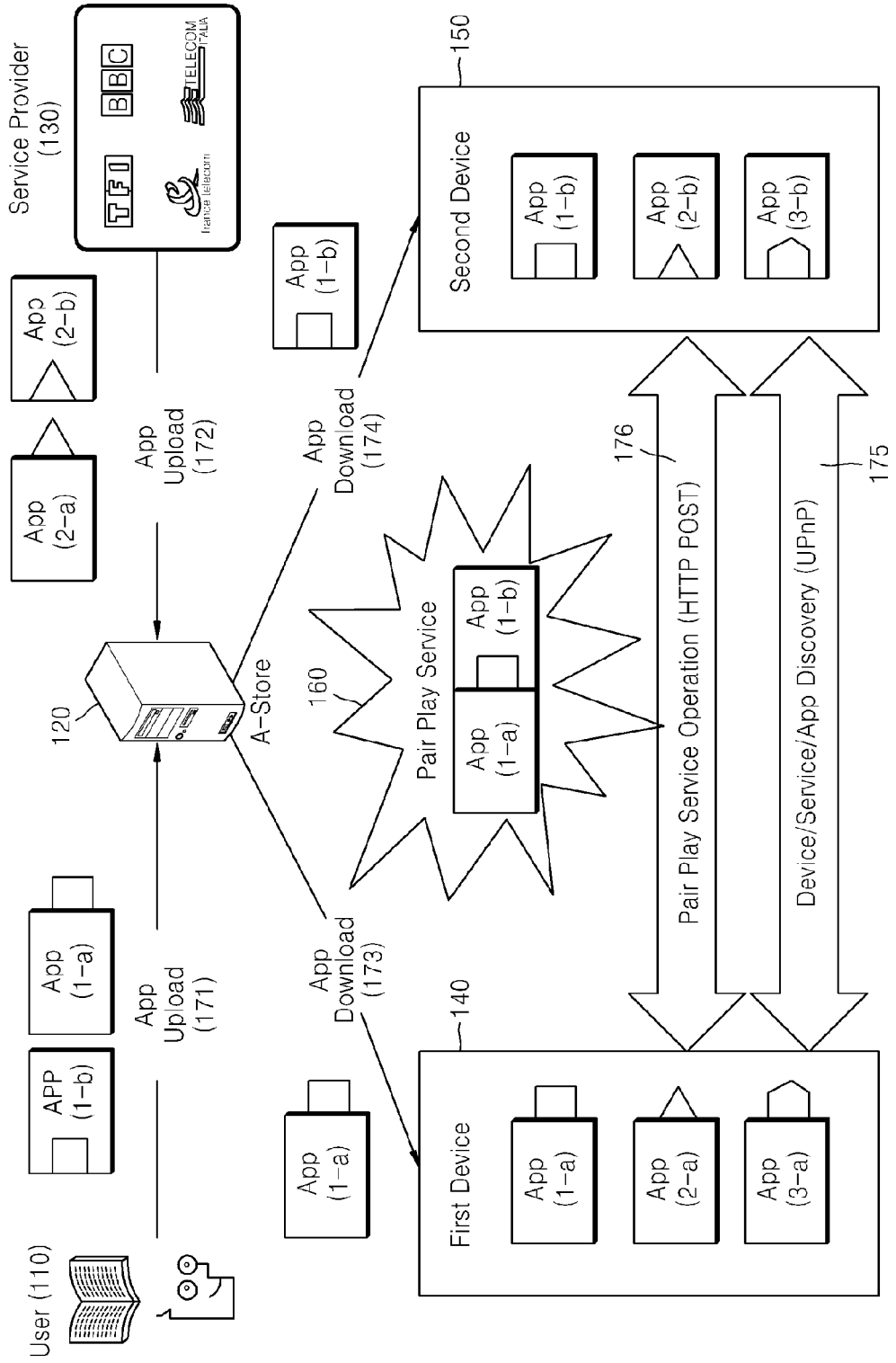
FIG. 1 is a schematic view for explaining a method of providing a pair play service, according to an exemplary embodiment.

The inventive concept will now be described more fully with reference to the accompanying drawings, in which exemplary embodiments are shown. In the drawings, the same reference numerals denote the same elements, and the sizes of components may be exaggerated for clarity. Expressions such as "at least one of," when preceding a list of elements, modify the entire list of elements and do not modify the individual elements of the list.

FIG. 1 is a schematic view for explaining a method of providing a pair play service, according to an exemplary embodiment. Referring to FIG. 1, in operations 171 and 172, a user 110 and a service provider 130 respectively upload applications, which are built by the user 110 and the service provider 130, to an application store 120.

First and second devices 140 and 150 download applications suitable for respective uses from the application store 120 in operations 173 and 174. For example, as shown, the first device 140 and the second device 150 respectively download an application 1-a and an application 1-b.

In operation 175, the first device 140 searches for the second device 150, pair play service of the second device 150, and a pair play application of the second device 150. In operation 176, the first device 140 performs an operation of the pair play application, thereby providing the pair play service (PPS) 160 using the applications 1-a and 1-b to the user 110.

When it comes to the pair play service, for example, while reproducing multimedia content and/or playing a game on a TV device, the user can control the TV device with a mobile terminal. In this case, since an application for multimedia content and/or game reproduction of the TV device and an application for TV device control of the mobile terminal are paired, the user is provided with the pair play service. Also, by using the mobile terminal, the user may receive from the TV device program information about programs that are to be reproduced in the TV device, and may purchase content (e.g., MP3 files and ringtones) related to the programs or use a related social network service (SNS).

Accordingly, the exemplary embodiments can provide a convergence service to a user by loading only applications suitable for uses onto each device which exists in a network, without mounting the same application onto a plurality of devices in the network, to pair the devices. Also, the exemplary embodiments can flexibly provide operations suitable for the uses and easily extend the functions of the devices since the applications suitable for the uses are provided from a service provider. Furthermore, the exemplary embodiments can contribute to the development of the IT industry in terms of manufacturing and distributing applications.

Figure 2:
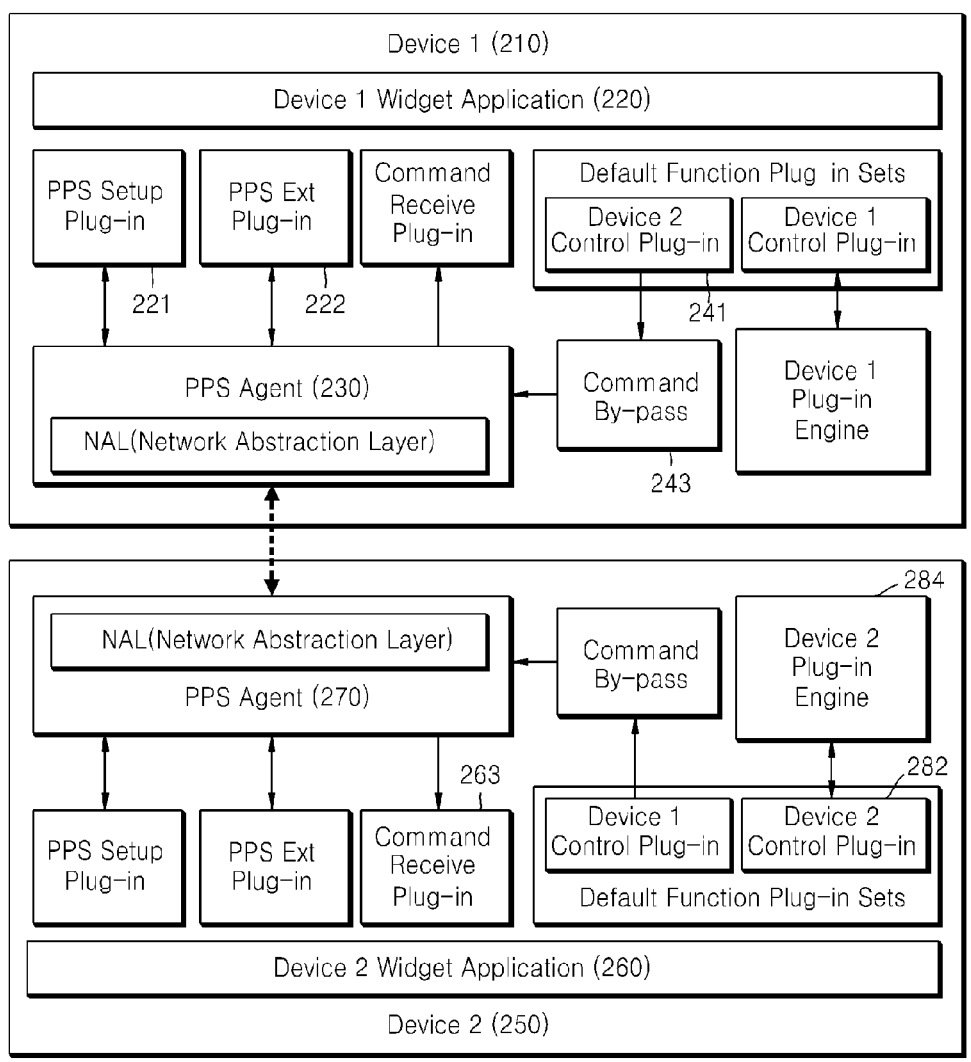
FIG. 2 illustrates first and second devices providing a pair play service, according to an exemplary embodiment.

FIG. 2 illustrates first and second devices 210 and 250 providing a pair play service, according to an exemplary embodiment. Referring to FIG. 2, the first device 210 and the second device 250 have respectively loaded thereon applications 220 and 260 suitable for respective uses. If the first device 210 is to use the application 260 of the second device 250, the first device 210 becomes a master device, and the second device 250 becomes a slave device. Otherwise, if the second device 250 is to use the application 220 of the first device 210, the second device 250 becomes the master device and the first device 210 becomes the slave device. In order to provide the pair play service, the first device 210 and the second device 250 may simultaneously operate as the master device and the slave device. Although a widget application is used as a pair play application in FIG. 2, it is understood to one of ordinary skill in the art that other application types may be used in other exemplary embodiments.

The application 220 of the first device 210 may control the second device 250, or an operation of the application 260 of the second device 250, by using a PPS setup plug-in 221, a PPS extended plug-in (hereinafter referred to as PPS Ext plug-in) 222, a second device control plug-in 241, a command by-pass module 243, and a PPS agent 230.

In detail, the PPS agent 230 may provide operations such as a search for a slave device providing a pair play service, a search for the pair play service of the slave device, and a search for a pair play application constituting the pair play service. The PPS agent 230 may further provide operations such as matching of the pair play application, determination of whether capability information used to execute the pair play application is satisfied, and matching of a data transmission/reception path. The PPS setup plug-in 221 may provide the above-described operations to the application 220 of the first device 210 by providing an interface for the above-described operations provided by the PPS agent 230.

The PPS agent 230 may further provide operations such as setting of a session of the pair play application for communicating with the slave device, and transmission of a request message to the slave device over the session. Due to the transmission of the request message provided by the PPS agent 230, a master device may perform operations such as control of the pair play application, transmission of data to the pair play application of the slave device, reception of a status of the pair play application of the slave device, and/or control of the slave device.

The PPS Ext plug-in 222 may provide the above-described operations to the application 220 of the first device 210 by providing an interface for the above-described operations provided by the PPS agent 230.

The second device control plug-in 241 may provide an interface for the control of the slave device provided by the PPS agent 230, through the command by-pass module 243. A PPS agent 270 of the second device 250 may provide an operation such as reception of the request message for controlling the slave device from the master device. A command receive plug-in 263 may provide an interface for sending the received request message to the application 260 of the second device 250. The second device 250 may use a device control operation provided by a second device plug-in engine 284 by using an interface provided by a second device control plug-in 282.

Figure 3:
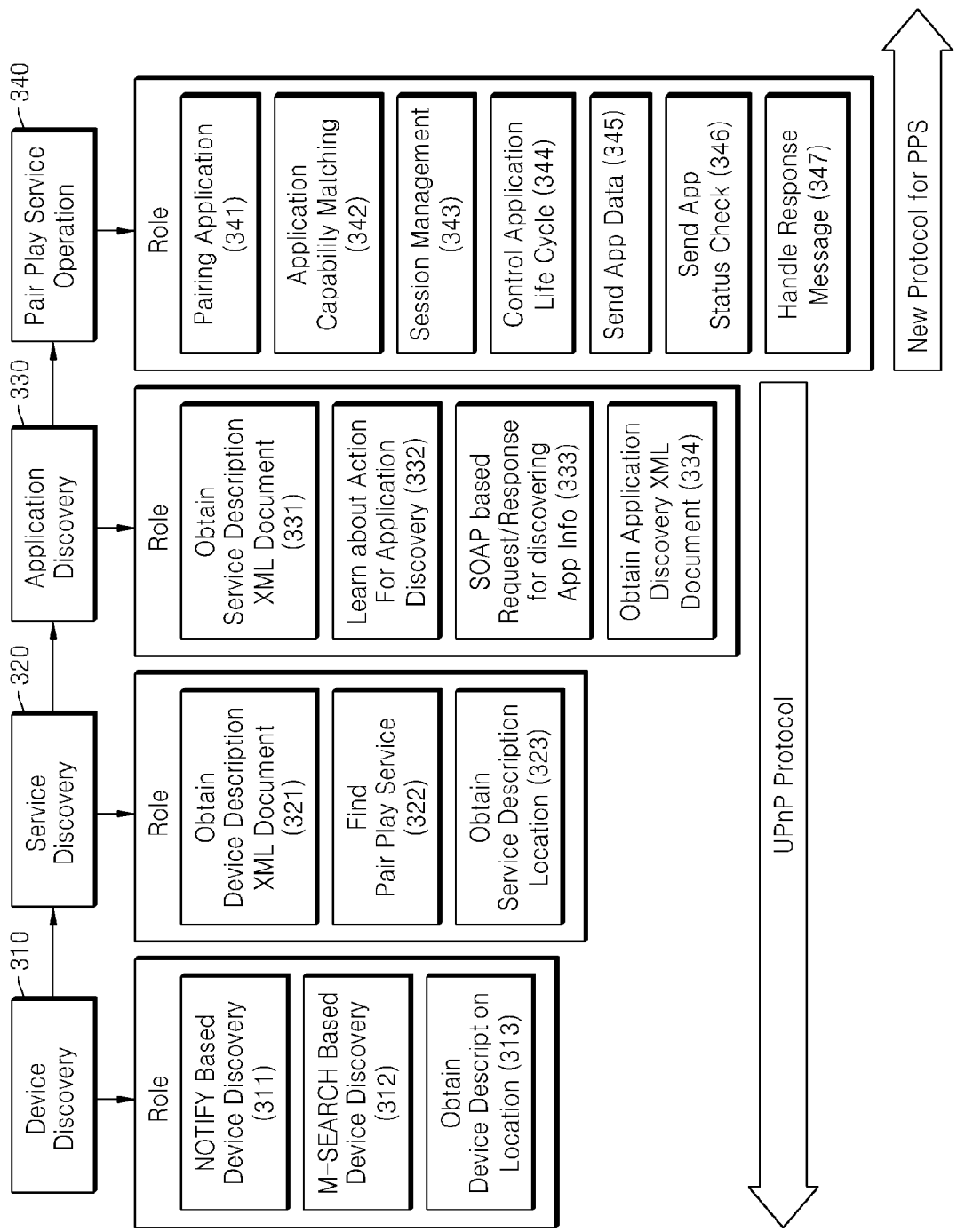
FIG. 3 illustrates operations for providing a pair play service, according to an exemplary embodiment.

FIG. 3 illustrates operations for providing a pair play service, according to an exemplary embodiment. Referring to FIG. 3, in operation 310, a master device searches for a slave device that provides the pair play service. Specifically, in operation 313, the master device acquires a location of a device description included in a NOTIFY message 311 multicast by the slave device or a response message 312 to an M-SEARCH message unicast by the master device.

In operation 320, the master device searches the slave device for the pair play service. Specifically, in operation 321, the master device acquires the device description by using the location of the device description, and in operation 322, the master device determines whether the pair play service exists. If it is determined in operation 322 that the pair play service exists, the master device acquires a location of a pair play service description included in the device description in operation 323.

In operation 331 of operation 330, the master device acquires the pair play service description by using the location of the pair play service description. In operation 332, the master device learns about an action for searching for a pair play application by using the pair play service description. In operation 333, the master device uses a simple object access protocol (SOAP) action that acquires a pair play application list, and in operation 334, the master device acquires information about the pair play application by using the SOAP action.

In operation 341 of operation 340, the master device pairs an application of the slave device as the pair play application, and in operation 342, the master device determines whether capability information of the pair play application is satisfied. In operation 343, the master device generates a session of the pair play application of the slave device. In operation 344, the master device controls the pair play application by using the session, in operation 345, the master device transmits data to the pair play application, in operation 346, the master device requests for a reception of a status of the pair play application, and in operation 347, the master device receives a pair play application response message.

Figure 4:
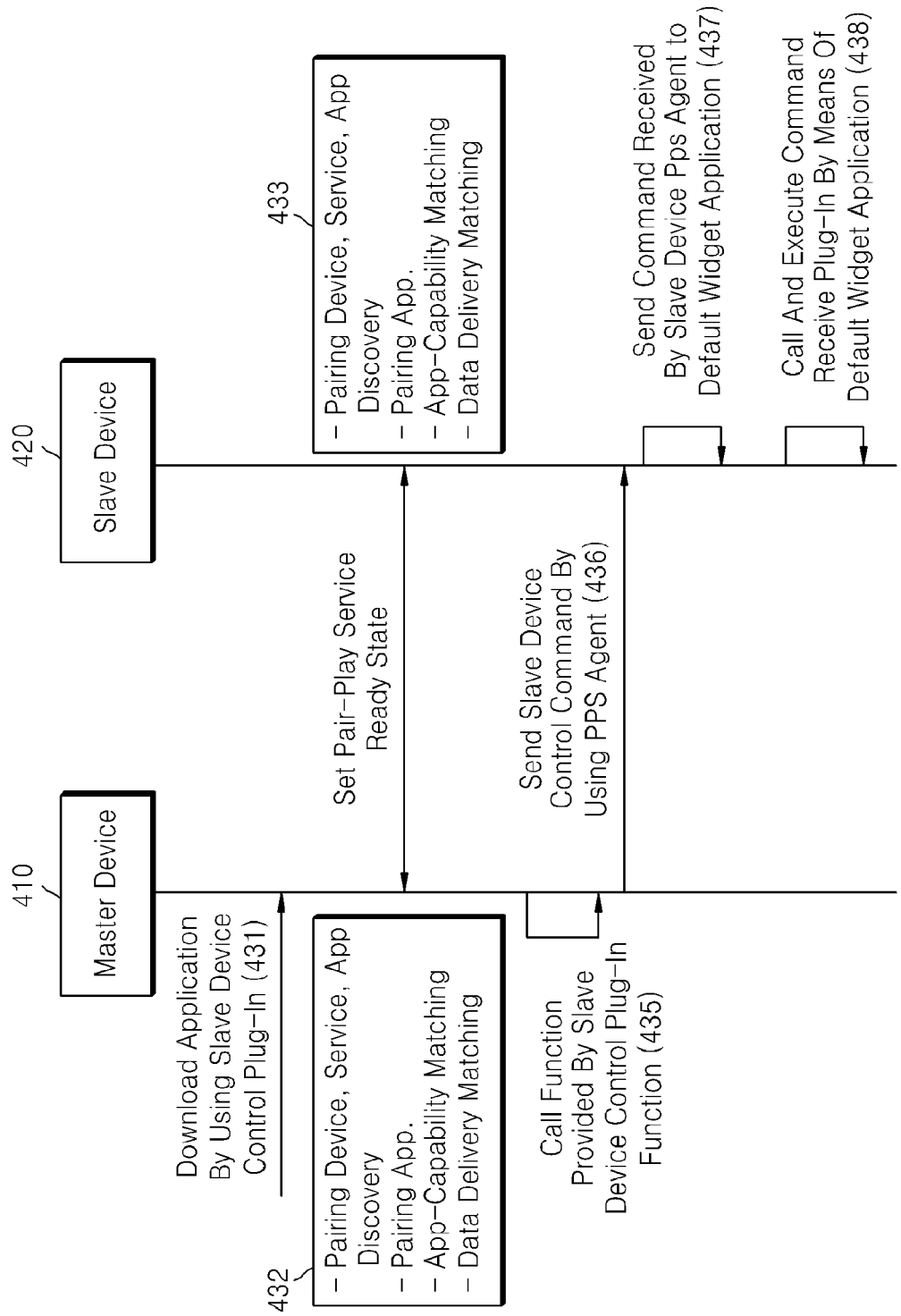
FIG. 4 illustrates a process of providing a pair play service, according to an exemplary embodiment.

FIG. 4 illustrates a process of providing a pair play service, according to an exemplary embodiment. Referring to FIG. 4, in operation 431, a master device 410 downloads an application by using a slave device control plug-in. In operations 432 and 433, the master device 410 searches for a slave device 420, searches for a pair play service, searches for a pair play application, pairs an application of the slave device 420 as the pair play application, and determines whether capability information of the pair play application is satisfied. The master device 410 generates a session of the pair play application of the slave device 420. Accordingly, the pair play service between the master device 410 and the slave device 420 is in a ready state.

In operation 435, the master device 410 calls an operation provided by the slave device control plug-in, by using a user interface. In operation 436, the master device 410 transmits a slave device control command to the slave device 420 by using a PPS agent. In operation 437, the PPS agent of the slave device 420 sends the received control command to the application of the slave device 420. In operation 438, the application of the slave device 420 may use an operation of device control provided by a slave device plug-in engine, by using the slave device control plug-in.

Figure 5:
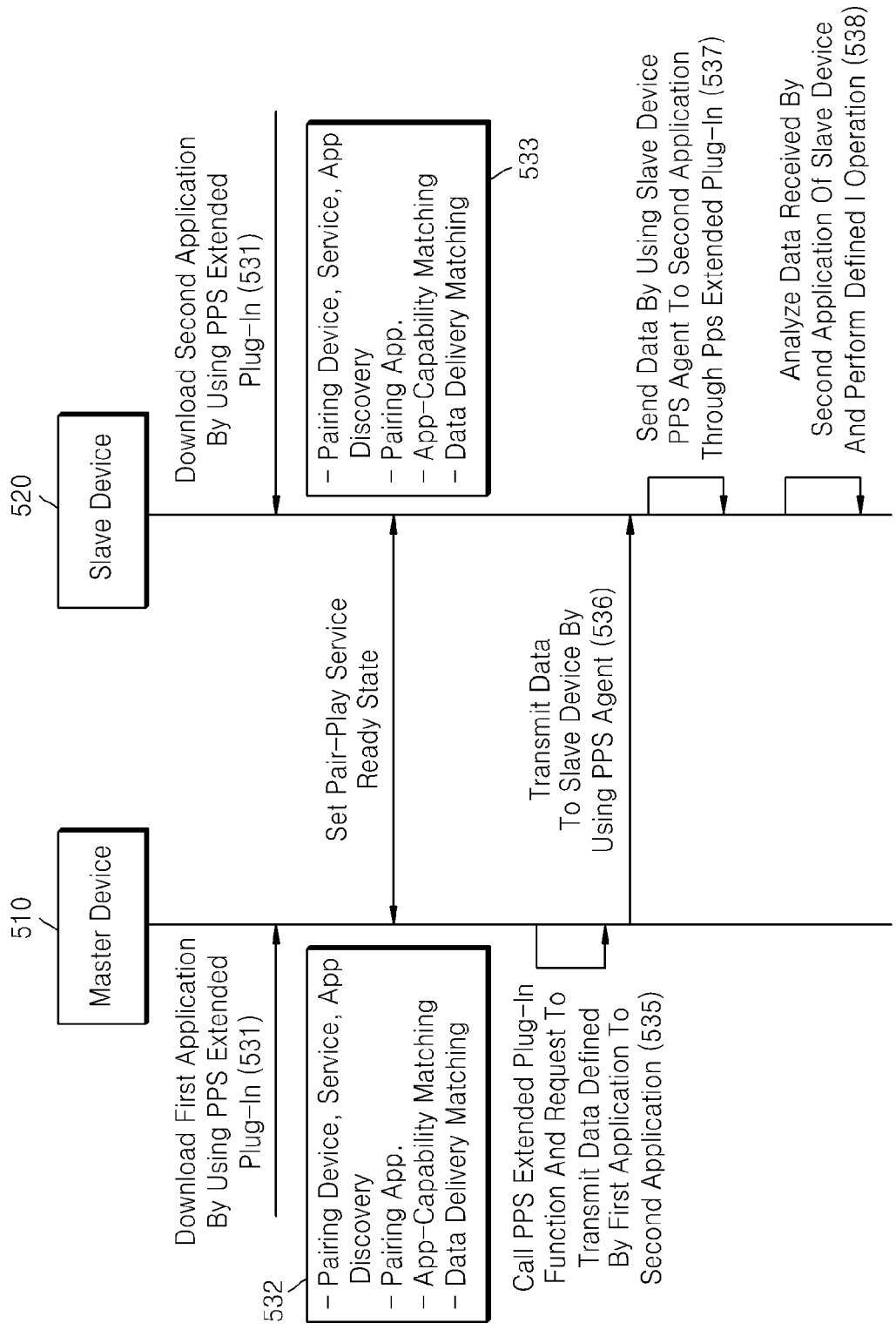
FIG. 5 illustrates a process of providing a pair play service, according to another exemplary embodiment.

FIG. 5 illustrates a process of providing a pair play service, according to another exemplary embodiment. Referring to FIG. 5, in operation 531, a master device 510 and a slave device 520 respectively download a first application and a second application using PPS Ext plug-ins. In operations 532 and 533, the master device 510 searches for the slave device 520, a pair play service, and a pair play application, pairs the second application of the slave device 520 as the pair play application, and determines whether capability information of the second application is satisfied. The master device 510 generates a session of the second application of the slave device 520. Accordingly, the pair play service between the master device 510 and the slave device 520 is in a ready state.

In operation 535, the master device 510 requests to transmit data defined by the first application of the master device 510 to the second application of the slave device 520 by calling an operation provided by the PPS Ext plug-in, by using a user interface. In operation 536, the master device 510 transmits the data to the slave device 520 by using a PPS agent. In operation 537, the PPS agent of the slave device 520 sends the received data to the second application of the slave device 520 by using an interface provided by the PPS Ext plug-in. In operation 538, the second application of the slave device 520 performs a given operation by using the received data.

FIG. 6 illustrates methods of searching for a device, according to exemplary embodiments. Referring to FIG. 6, in method 610, a master device searches for a slave device that provides a pair play service. The master device may acquire a location of a device description based on a NOTIFY message multicast by the slave device. For example, the master device may access a location, "http://myipaddress.com/device-description-rootdevice.xml," and may acquire the device description of the slave device therefor.

Alternatively, in method 620, the master device may unicast an M-SEARCH message to the slave device, and receive a response message from the slave device. For example, the master device may access a location, "http://myIPAddress.com/device-desc.xml," and acquire the device description of the slave device therefor. Since the methods 610 and 620 of searching for the device of FIG. 6 follow the UPnP Device Architecture standard, a detailed explanation thereof will not be given.

Figure 7:
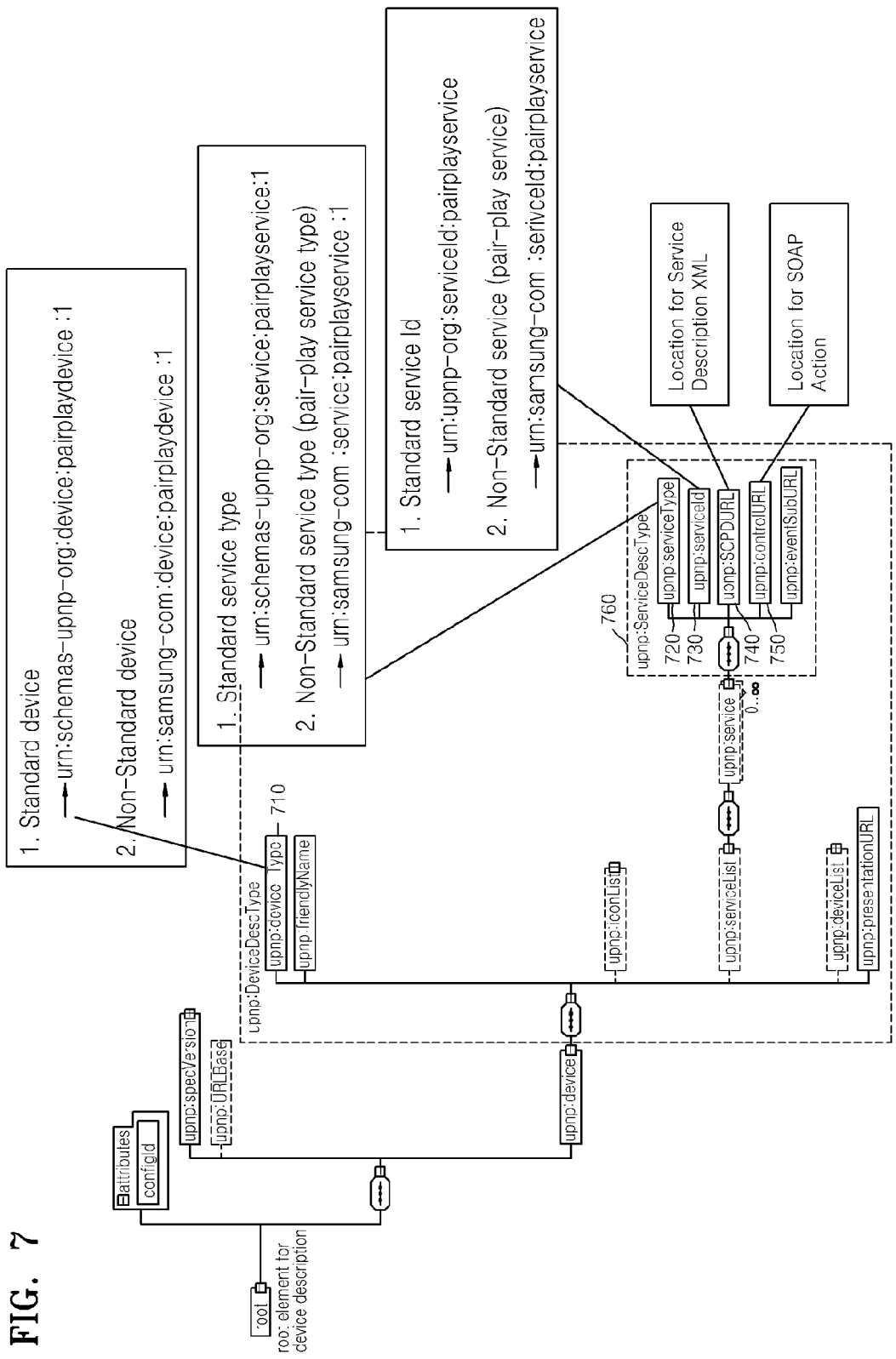
FIG. 7 illustrates a device description according to an exemplary embodiment.

FIG. 7 illustrates a device description according to an exemplary embodiment. After a master device acquires a device description by using a location of a device description, the master device determines whether a pair play service exists. For example, referring to FIG. 7, the master device acquires the device description including a slave device type 710 and pair play service information 760.

The pair play service information 760 includes a pair play service type 720, a pair play service ID 730, location information 740 used to acquire a pair play service description, and location information 750 for controlling the pair play service. Although the device description is exemplarily defined in FIG. 7, it is to be understood by one of ordinary skill in the art that the present exemplary embodiment is not limited thereto and other definitions may be made. Since the device description follows the UPnP Device Architecture standard, a detailed explanation thereof will not be given.

Figure 8:
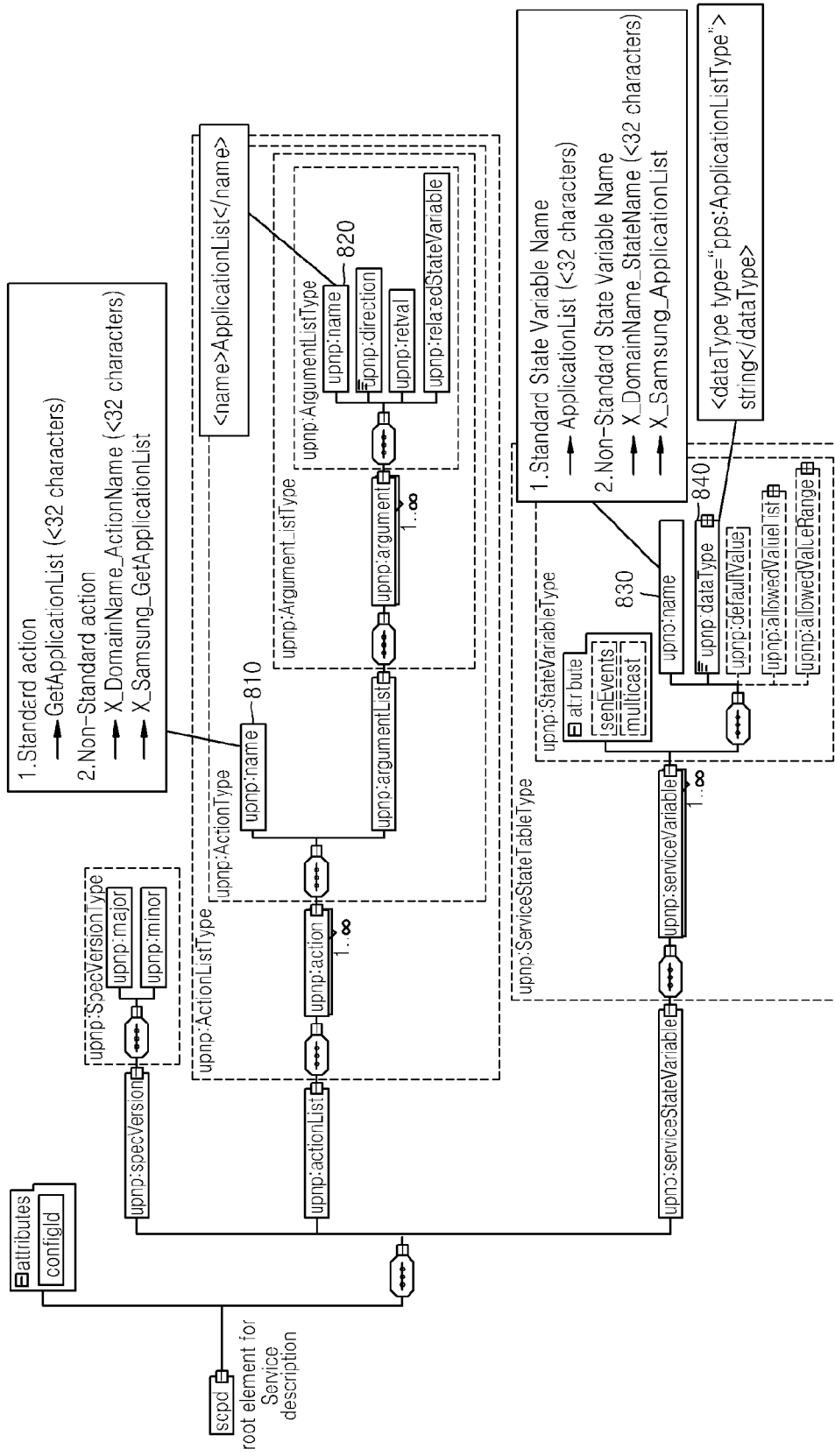
FIG. 8 illustrates a service description according to an exemplary embodiment.

FIG. 8 illustrates a service description according to an exemplary embodiment. A master device acquires a pair play service description by using the location information 740 (FIG. 7) used to acquire the pair play service description. The master device may learn about a SOAP action for searching for a pair play application by using the pair play service description, and acquire information about the pair play application by using the SOAP action.

Referring to FIG. 8, the master device may acquire information about the pair play application through an ApplicationList variable 830 corresponding to an ApplicationListType 840, by using a SOAP action GetApplicationList 810. Although a name of the SOAP action, a state variable, and a data type are exemplarily defined in FIG. 8, it is to be understood by one of ordinary skill in the art that other schemas may be defined.

Figure 9:
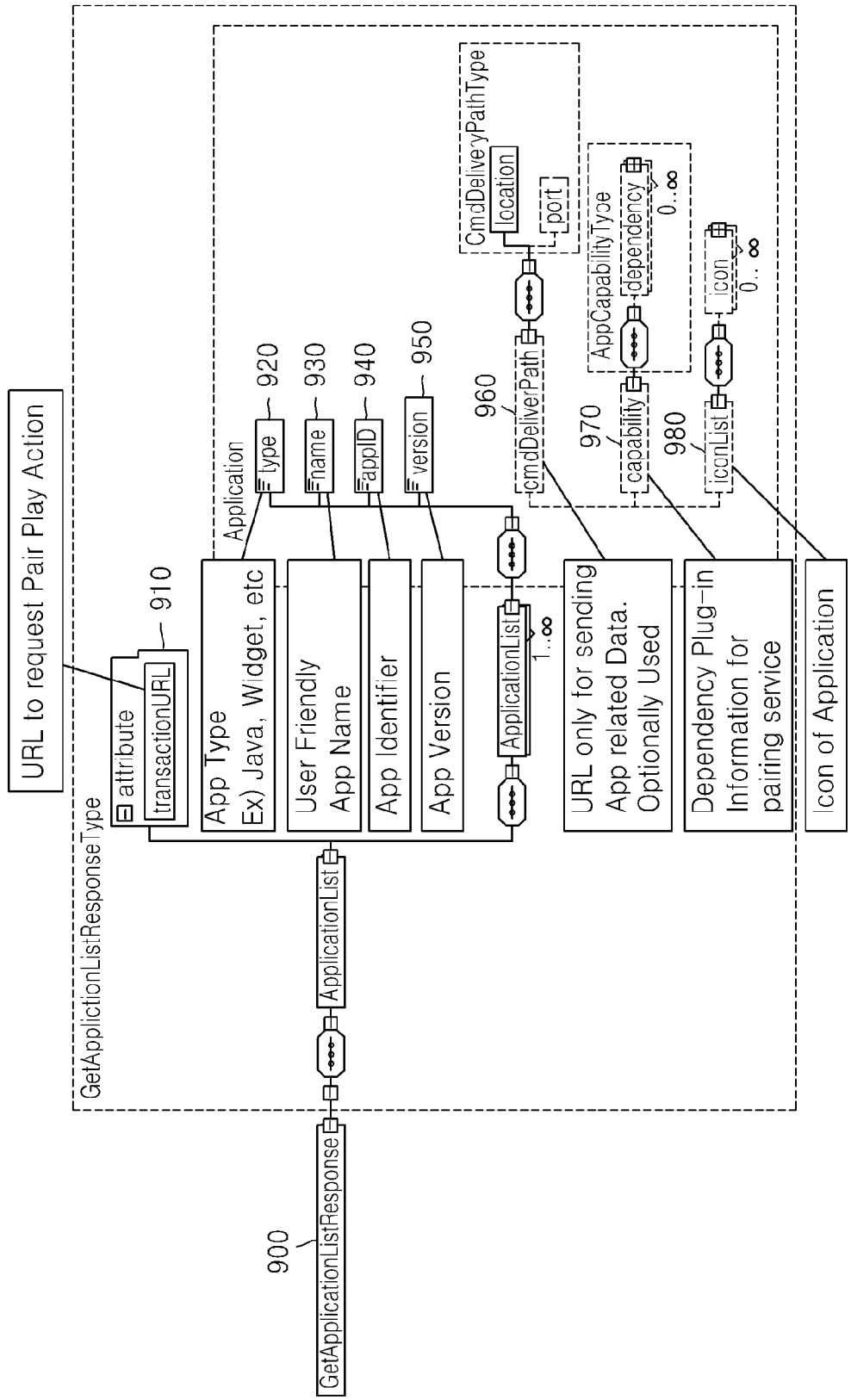
FIG. 9 illustrates pair play application information according to an exemplary embodiment.

FIG. 9 illustrates pair play application information 900 according to an exemplary embodiment. Referring to FIG. 9, the pair play application information 900 includes transactionURL information 910 indicating a uniform resource locator (URL) for transmitting and receiving data commonly related to a pair play application, a pair play application type 920, a pair play application name 930, a pair play application ID 940, a pair play application version 950, cmdSendsPath information 960 indicating a URL for transmitting and receiving data related to the pair play application, capability information 970 used to execute the pair play application, and icon information 980 about the pair play application.

The pair play application ID 940 refers to a value for pairing an application of a master device with an application of a slave device. If the application of the master device and the application of the slave device have the same pair play application ID 940, the master device may use a pair play service. The transactionURL information 910 or the cmdDeliverPath information 960 includes URL and port information used to communicate between the master device and the slave device by using the pair play application. The pair play application type 920 includes a widget type, a Java type, a HyperText Markup Language (HTML) type, and/or a native type. The capability information 970 used to execute the pair play application includes resource information and plug-in information used to execute the pair play application. The master device determines whether the pair play application of the slave device can be used, by using the capability information 970.

Figure 10:
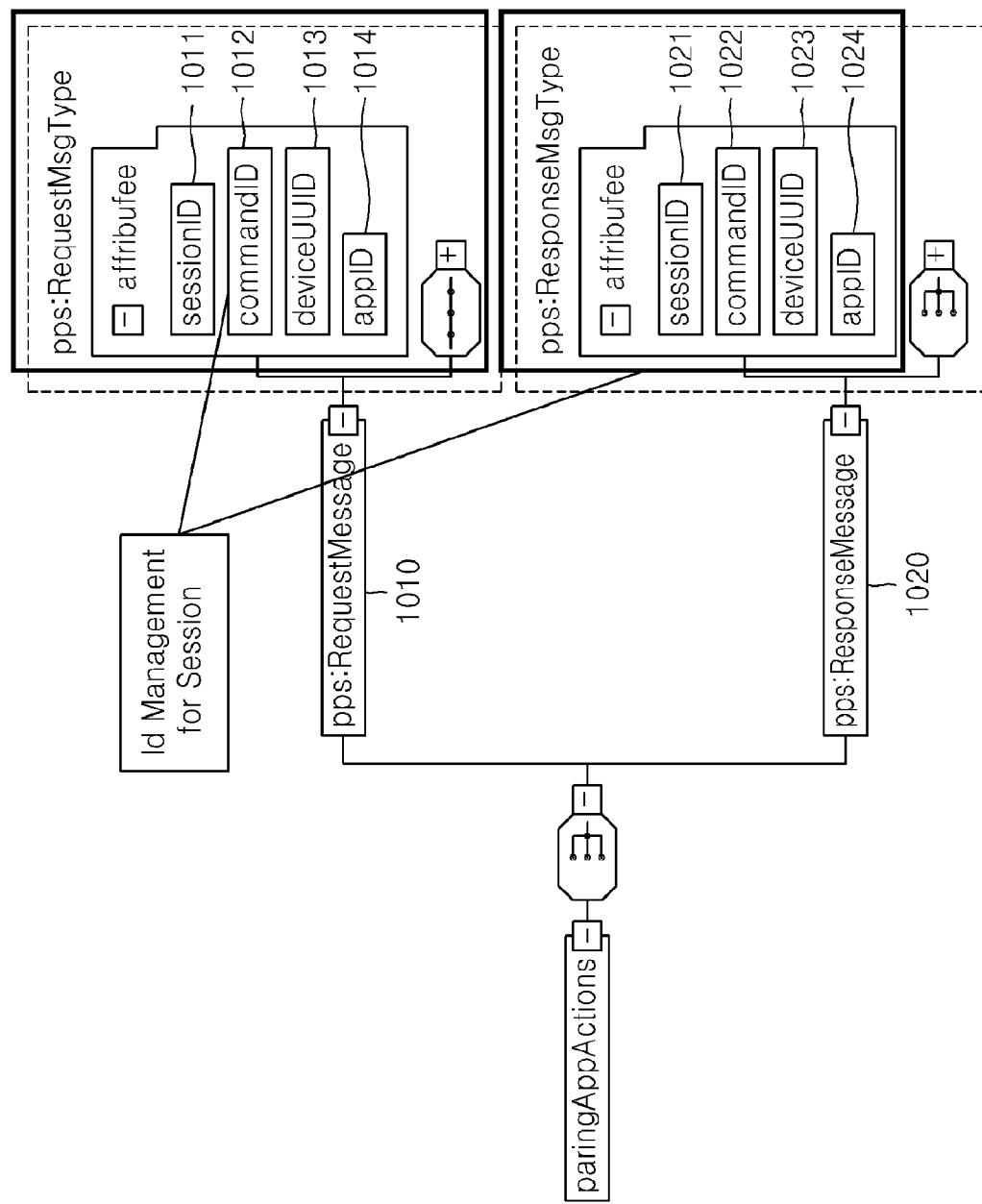
FIG. 10 illustrates a common format of a request message and a response message, according to an exemplary embodiment.

FIG. 10 illustrates a common format of a request message and a response message, according to an exemplary embodiment. After a master device generates a session for communicating with a pair play application of a slave device by using transactionURL information or cmdDeliverPath information, the master device sends a request message 1010 to the slave device over the session, and receives a response message 1020 from the slave device. Referring to FIG. 10, a RequestMsg 1010 corresponding to a request message and a ResponseMsg 1020 corresponding to a response message include device ID 1013 and 1023 included in a device description, pair play applications IDs 1014 and 1024 included in a pair play service description, session IDs 1011 and 1021 identifying sessions, and commandIDs 1012 and 1022 identifying operations of pair play applications, respectively.

The session IDs 1011 and 1021 are randomly generated in an application of the master device, and are used as session identifiers during communication between pair play applications. The commandIDs 1012 and 1022 are randomly generated in the application of the master device, and are used as operation identifiers identifying pair play service operations during the sessions. The commandID included in the RequestMsg 1010 is also included as a response to the RequestMsg 1010 in the ResponseMsg 1020 later received from the slave device.

Figure 11:
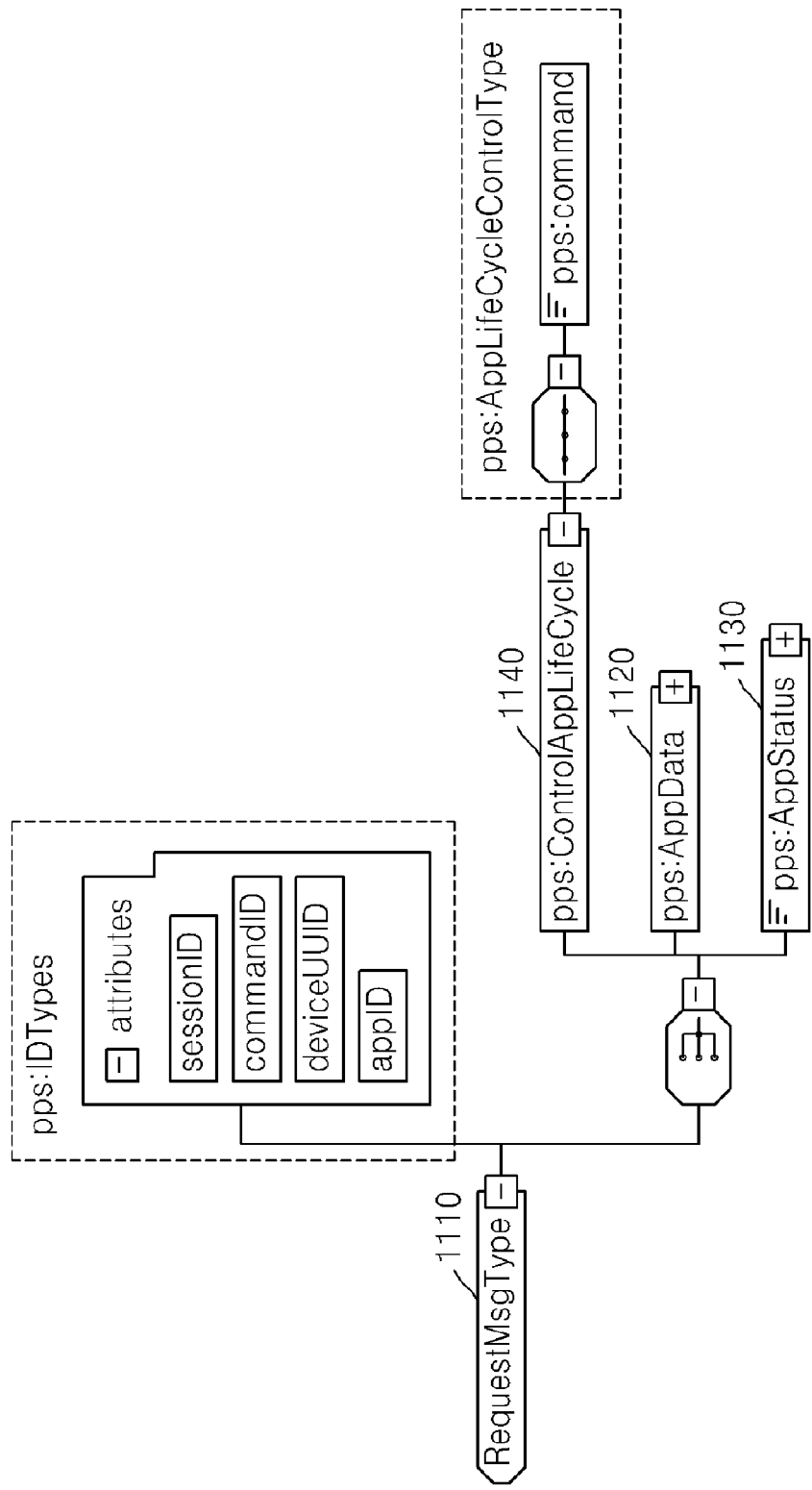
FIG. 11 illustrates a format of a request message, according to an exemplary embodiment.

FIG. 11 illustrates a format of a request message, according to an exemplary embodiment. A master device may control a pair play application of a slave device by using a request message, transmit data to the pair play application of the slave device, and request to receive a status of the pair play application of the slave device. Although not shown, the master device may control the slave device through the pair play application by using the request message.

Referring to FIG. 11, if the master device controls the pair play application of the slave device by using the request message, a RequestMsg 1110 may include a second commandID identifying at least one of installation of the pair play application, execution of the pair play application, suspension of the execution of the pair play application, and removal of the pair play application. If the master device transmits data to the pair play application of the slave device by using the request message, a RequestMsg 1120 may include data to be transmitted. If the master device transmits the data to the pair play application of the slave device by using the request message, a RequestMsg 1130 may include a statusCheckType identifying a status type of the pair play application. The statusCheckType includes a "isAlive" type including information about whether the pair play application is normally operated. If the master device controls the slave device by using the request message, a RequestMsg 1140 includes a command controlling the slave device.

Figure 12:
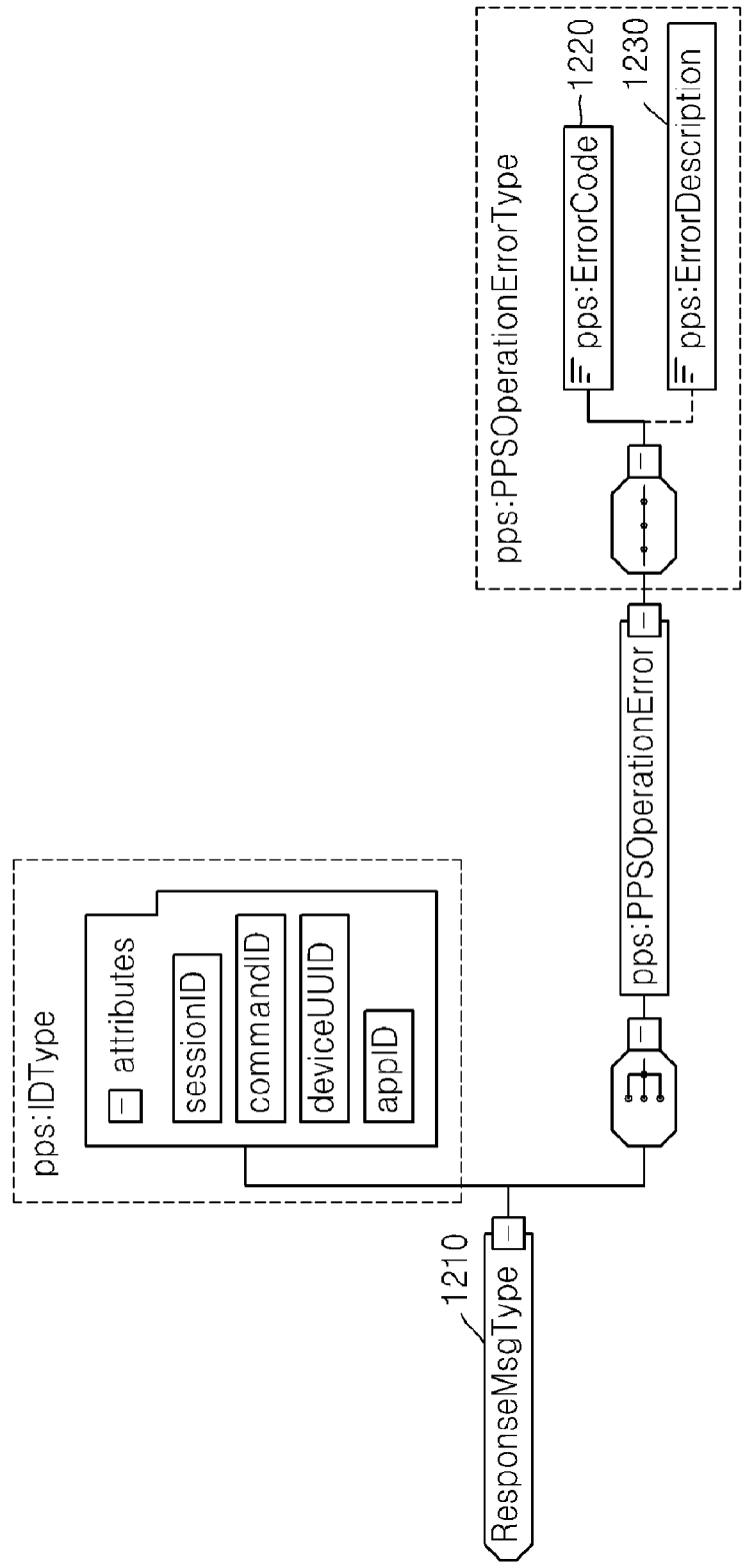
FIG. 12 illustrates a format of a response message, according to an exemplary embodiment.

FIG. 12 illustrates a format of a response message, according to an exemplary embodiment. Referring to FIG. 12, a ResponseMsg 1210 includes an error description 1230 and an error code 1220 identifying a type of an error occurring while a slave device processes a RequestMsg.

Figure 13:
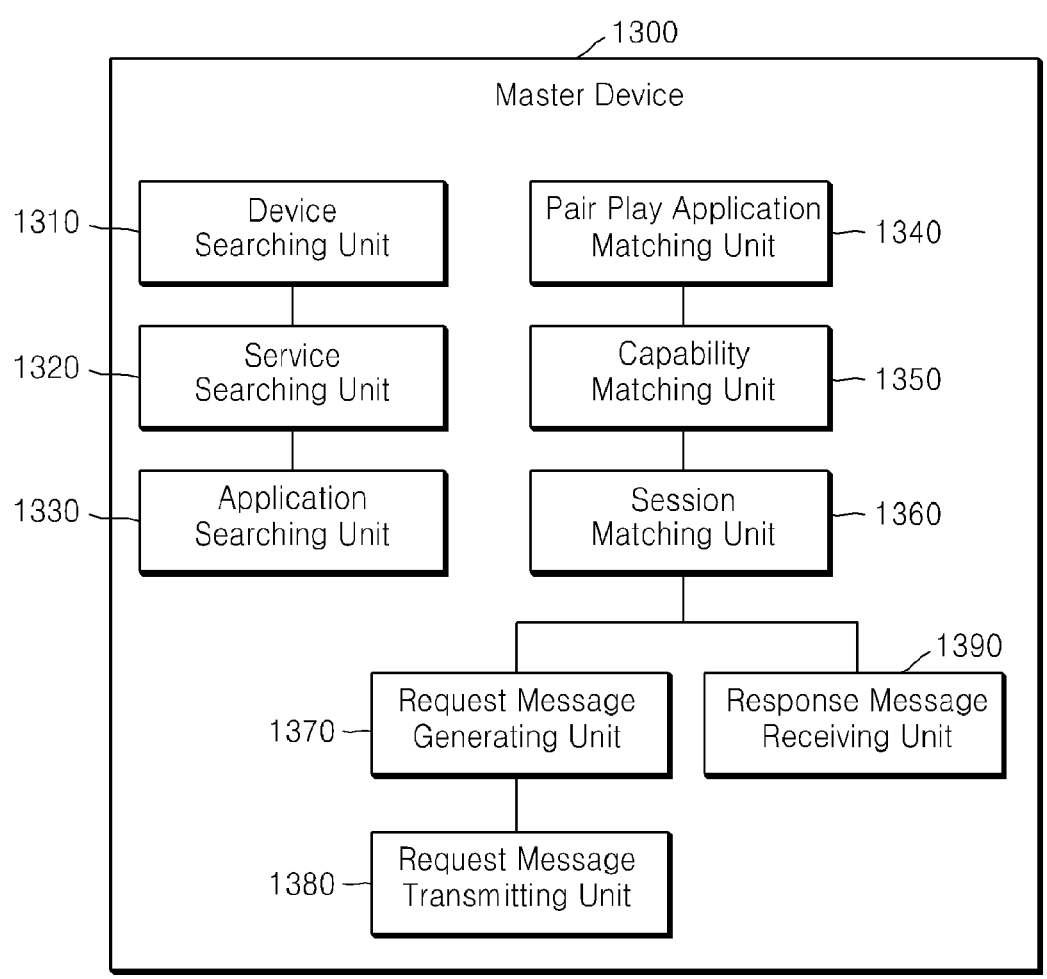
FIG. 13 is a block diagram of a master device according to an exemplary embodiment.

FIG. 13 is a block diagram of a master device 1300 according to an exemplary embodiment. Referring to FIG. 13, the master device 1300 includes a device searching unit 1310, a service searching unit 1320, an application searching unit 1330, a pair play application matching unit 1340, a capability matching unit 1350, a session managing unit 1360, a request message generating unit 1370, a request message transmitting unit 1380, and a response message receiving unit 1390.

The device searching unit 1310 searches for a slave device that provides a pair play service. For example, the device searching unit 1310 may acquire a location of a device description included in a response message to an M-SEARCH message unicast by the master device 1300 or a NOTIFY message multicast by the slave device.

The service searching unit 1320 searches for the pair play service of the slave device. For example, the service searching unit 1320 may acquire the device description by using the location of the device description which is acquired by the device searching unit 1310, and acquires a location of a pair play service description included in the device description.

The application searching unit 1330 searches for a pair play application constituting the pair play service. For example, the application searching unit 1330 may acquire the pair play service description by using the location of the pair play service description which is acquired by the service searching unit 1320. The application searching unit 1330 may then acquire at least one of transactionURL information indicating a URL for transmitting and receiving data commonly related to the pair play application, a pair play application type, a pair play application name, a pair play application ID, a pair play application version, cmdDeliverPath information indicating a URL for transmitting and receiving data related to the pair play application, capability information used to execute the pair play application, and/or icon information about the pair play application, by using a SOAP action that acquires a pair play application list included in the pair play service description.

The pair play application matching unit 1340 matches a pair play application having the same pair play application ID. The capability matching unit 1350 determines whether capability information of the pair play application is satisfied. The capability information includes resource information and plug-in information used to execute the pair play application. The session managing unit 1360 generates a session for communicating with the pair play application of the slave device by using the transactionURL information or the cmdDeliverPath information.

The request message generating unit 1370 generates a RequestMsg in order to transmit a request message to the slave device over the session. The request message transmitting unit 1380 transmits the RequestMsg to the slave device over the session. The response message receiving unit 1390 receives as a response message to the RequestMsg a ResponseMsg from the slave device over the session.

For example, the master device 1300 may include a bus coupled to the units of the devices of FIG. 13, and at least one processor coupled to the bus, and may include a memory coupled to the bus in order to store a command, a received message, or a generated message, and coupled to the at least one processor for performing the aforementioned commands.

While not restricted thereto, the exemplary embodiments may be embodied as computer-readable codes on a computer-readable recording medium. The computer-readable recording medium is any data storage device that can store data which can be thereafter read by a computer system. Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), etc. The computer-readable recording medium can also be distributed over network coupled computer systems so that the computer readable codes are stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all exemplary embodiments, one or more units of any of the above-described devices 210, 250, 410, 420, 510, 520, and 1300 can include a processor or microprocessor executing a computer program stored in a computer-readable medium.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of providing a pair play service which is performed by a master device, the method comprising:
   searching, by the master device, for a slave device that provides the pair play service;
   searching, by the master device, for the pair play service of the searched slave device; and
   searching, by the master device, for a pair play application of the slave device constituting the searched pair play service.

2. The method of claim 1, wherein the searching for the slave device comprises acquiring a location of a device description which is included in a response message to an M-SEARCH message unicast by the master device or a NOTIFY message multicast by the slave device.

3. The method of claim 2, wherein the searching for the pair play service comprises:
   acquiring the device description by using the acquired location of the device description; and
   acquiring, from the acquired device description, a location of a pair play service description which is included in the device description.

4. The method of claim 3, wherein the searching for the pair play application comprises:
   acquiring the pair play service description by using the acquired location of the pair play service description; and
   acquiring at least one of transactionURL information indicating a uniform resource locator (URL) for transmitting and receiving data commonly related to the pair play application, a pair play application type, a pair play application name, a pair play application ID, a pair play application version, cmdDeliverPath information indicating a URL for transmitting and receiving data related to the pair play application, capability information used to execute the pair play application, and icon information about the pair play application, by using a simple object access protocol (SOAP) action that acquires a pair play application list which is included in the pair play service description.

5. The method of claim 4, wherein the pair play application type comprises at least one of a widget type, a Java type, a HyperText Markup Language (HTML) type, and a native type.

6. The method of claim 4, further comprising matching, with the pair play application of the slave device, a pair play application of the master device having a same pair play application ID as the acquired pair play application ID.

7. The method of claim 4, further comprising:
determining whether the acquired capability information is satisfied,
wherein the capability information comprises at least one of resource information and plug-in information used to execute the pair play application.

8. The method of claim 4, wherein the transactionURL information or the cmdDeliverPath information comprises at least one of a uniform resource locator (URL) and port information used to communicate between the master device and the slave device by using the pair play application.

9. The method of claim 4, further comprising:
generating a session of the pair play application for communicating with the slave device by using the transactionURL information or the cmdDeliverPath information;
generating a RequestMsg in order to send a request message to the slave device over the generated session;
transmitting the generated RequestMsg to the slave device over the generated session; and
receiving, as a response message to the transmitted RequestMsg, a ResponseMsg from the slave device over the generated session.

10. The method of claim 9, wherein the RequestMsg or the ResponseMsg comprises a device ID included in the device description, the pair play application ID included in the pair play service description, a session ID which identifies the generated session, and a commandID that identifies an operation of the pair play application.

11. The method of claim 9, wherein the RequestMsg performs at least one of control of the pair play application, transmission and/or reception of data of the pair play application, transmission and/or reception of a status of the pair play application, and control of the slave device by using the pair play application.

12. The method of claim 11, wherein, if the RequestMsg performs the control of the pair play application, the RequestMsg comprises a second commandID that identifies at least one of installation of the pair play application, execution of the pair play application, suspension of the execution of the pair play application, and removal of the pair play application.

13. The method of claim 11, wherein, if the RequestMsg performs the transmission/reception of the status of the pair play application, the RequestMsg comprises a statusCheckType that identifies a status type of the pair play application.

14. The method of claim 11, wherein, if the RequestMsg performs the control of the slave device by using the pair play application, the RequestMsg comprises a command that controls the slave device.

15. The method of claim 9, wherein the ResponseMsg comprises at least one of an error code, which identifies a type of an error occurring while the slave device processes the transmitted RequestMsg, and an error description of the error.

16. A computer-readable recording medium having embodied thereon a program for executing the method of claim 1.

17. A master device comprising:
a device searching unit which searches for a slave device that provides a pair play service;
a service searching unit which searches for the pair play service of the searched slave device; and
an application searching unit which searches for a pair play application of the slave device constituting the searched pair play service.

18. The master device of claim 17, wherein the device searching unit acquires a location of a device description which is included in a response message to an M-SEARCH message unicast by the mater device or a NOTIFY message multicast by the slave device.

19. The master device of claim 18, wherein the service searching unit acquires the device description by using the acquired location of the device description, and acquires, from the acquired device description, a location of a pair play service description which is included in the device description.

20. The master device of claim 19, wherein the application searching unit acquires the pair play service description by using the location of the pair play service description, and acquires at least one of transactionURL information indicating a URL for transmitting and receiving data commonly related to the pair play application, a pair play application type, a pair play application name, a pair play application ID, a pair play application version, cmdDeliverPath information indicating a URL for transmitting and receiving data related to the pair play application, capability information used to execute the pair play application, and icon information about the pair play application, by using a simple object access protocol (SOAP) action that acquires a pair play application list which is included in the pair play description.

21. The master device of claim 20, wherein the pair play application type comprises at least one of a widget type, a Java type, a HyperText Markup Language (HTML) type, and a native type.

22. The master device of claim 20, further comprising a pair play application matching unit which matches, with the pair play application of the slave device, a pair play application having a same pair play application ID as the acquired pair play application ID.

23. The master device of claim 20, further comprising:
a capability matching unit which determines whether the acquired capability information is satisfied,
wherein the capability information comprises at least one of resource information and plug-in information used to execute the pair play application.

24. The master device of claim 20, wherein the transactionURL information or the cmdDeliverPath information comprises at least one of a uniform resource locator (URL) and port information used for communication between the master device and the slave device by using the pair play application.

25. The master device of claim 20, further comprising:
a session managing unit which generates a session of the pair play application for communicating with the slave device by using the transactionURL information or the cmdDeliverPath information;
a request message generating unit which generates a RequestMsg in order to send a request message to the slave device over the generated session;
a request message transmitting unit which transmits the generated RequestMsg to the slave device over the generated session; and a response message receiving unit which receives, as a response message to the transmitted RequestMsg, a ResponseMsg from the slave device over the generated session.

26. The master device of claim 25, wherein the RequestMsg or the ResponseMsg comprises a device ID included in the device description, the pair play application ID included in the pair play service description, a session ID which identifies the generated session, and a commandID that identifies an operation of the pair play application.

27. The master device of claim 25, wherein the RequestMsg performs at least one of control of the pair play application, transmission and/or reception of data of the pair play application, transmission and/or reception of a status of the pair play application, and control of the slave device by using the pair play application.

28. The master device of claim 27, wherein, if the RequestMsg performs the control of the pair play application, the RequestMsg comprises a second commandID that identifies at least one of installation of the pair play application, execution of the pair play application, suspension of the execution of the pair play application, and removal of the pair play application.

29. The master device of claim 27, wherein, if the RequestMsg performs the transmission/reception of the status of the pair play application, the RequestMsg comprises a statusCheckType that identifies a status type of the pair play application.

30. The master device of claim 27, wherein, if the RequestMsg performs the control of the slave device by using the pair play application, the RequestMsg comprises a command that controls the slave device.

31. The master device of claim 25, wherein the ResponseMsg comprises at least one of an error code, which identifies a type of an error occurring while the slave device processes the transmitted RequestMsg, and an error description of the error.

32. A slave device providing a pair play service to a master device, the slave device comprising:

a pair play application having an operation controlled by the master device as the pair play service; and a pair play service agent which transmits, to the master device, a location of a device description used by the master device to locate the pair play application, and which receives, from the master device, data used to perform the operation of the pair play application, the data being received over a session of the pair play application generated by the master device.

33. The slave device as claimed in claim 32, wherein the pair play service agent transmits a response message in response to an M-search message unicast by the master device, or multicasts a NOTIFY message, the response message and the NOTIFY message including the location of the device description.

34. The slave device as claimed in claim 32, wherein the pair play service agent transmits a response message to the master device in response to the received data, the response message indicating whether an error occurs while processing the received data.

35. The slave device as claimed in claim 32, wherein the pair play application is at least one of a widget type, a Java type, a HyperText Markup Language (HTML) type, and a native type.

36. A system performing a pair play service, the system comprising:

a slave device which provides the pair play service, the slave device comprising a pair play application constituting the pair play service; and a master device comprising:

a device searching unit which searches for the slave device that provides a pair play service, a service searching unit which searches for the pair play service of the searched slave device, and an application searching unit which searches for the pair play application of the slave device constituting the searched pair play service.

* * * * *